US008115363B2

(12) United States Patent
Poon

(10) Patent No.: US 8,115,363 B2
(45) Date of Patent: Feb. 14, 2012

(54) COMMUTATOR

(75) Inventor: Patrick Ping Wo Poon, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 159 days.

(21) Appl. No.: 12/351,619

(22) Filed: Jan. 9, 2009

(65) Prior Publication Data

US 2009/0179519 A1 Jul. 16, 2009

(30) Foreign Application Priority Data

Jan. 11, 2008 (GB) .................................. 0800464.0

(51) Int. Cl.
*H01R 39/06* (2006.01)
*H02K 13/04* (2006.01)

(52) U.S. Cl. ......................... 310/237; 310/233; 310/235

(58) Field of Classification Search .................. 310/237, 310/233, 235
See application file for complete search history.

(56) References Cited

U.S. PATENT DOCUMENTS

| | | | | |
|---|---|---|---|---|
| 1,898,929 | A * | 2/1933 | Apple et al. | 310/235 |
| 3,459,983 | A * | 8/1969 | Bowcott | 310/234 |
| 3,812,576 | A * | 5/1974 | Yamaguchi | 29/597 |
| 5,157,299 | A * | 10/1992 | Gerlach | 310/237 |
| 5,208,502 | A * | 5/1993 | Yamashita et al. | 310/219 |
| 5,369,326 | A * | 11/1994 | Strobl | 310/235 |
| 5,386,167 | A * | 1/1995 | Strobi | 310/237 |
| 5,442,849 | A * | 8/1995 | Strobl | 29/597 |
| 5,552,652 | A * | 9/1996 | Shimoyama et al. | 310/237 |
| 5,629,576 | A * | 5/1997 | Shimoyama | 310/237 |
| 5,677,588 | A * | 10/1997 | Strobl | 310/237 |
| 5,898,989 | A * | 5/1999 | Strobl | 29/597 |
| 5,912,523 | A * | 6/1999 | Ziegler et al. | 310/237 |
| 5,925,961 | A * | 7/1999 | Sugiyanma | 310/237 |
| 5,925,962 | A * | 7/1999 | Kobman et al. | 310/237 |
| 5,932,949 | A * | 8/1999 | Ziegler et al. | 310/236 |
| 5,962,946 | A * | 10/1999 | Kobman et al. | 310/233 |
| 6,157,108 | A * | 12/2000 | Potocnik et al. | 310/235 |
| 6,242,838 | B1 * | 6/2001 | Kiyose et al. | 310/233 |
| 6,259,183 | B1 * | 7/2001 | Hotta et al. | 310/233 |
| 6,392,325 | B2 * | 5/2002 | Fujii et al. | 310/234 |
| 6,525,445 | B2 * | 2/2003 | Kiyose et al. | 310/233 |
| 6,584,673 | B2 * | 7/2003 | Schmidt | 29/597 |
| 6,617,743 | B1 * | 9/2003 | Potocnik et al. | 310/237 |
| 6,634,082 | B1 * | 10/2003 | Ziegler et al. | 29/597 |

(Continued)

FOREIGN PATENT DOCUMENTS

FR 2633781 A3 * 1/1990

(Continued)

*Primary Examiner* — Quyen Leung
*Assistant Examiner* — Alex W Mok
(74) *Attorney, Agent, or Firm* — Muncy, Geissler, Olds & Lowe, PLLC

(57) ABSTRACT

A commutator 10 comprises an electrically non-conductive base 12; and a plurality of electrically conducting segments 16 supported by the base 12. Each segment 16 comprising a first electrically conductive inner layer 18 provided on the base 12, and a second electrically conductive outer layer 20 fixed to the inner layer 18. The inner and outer layers 18, 20 have opposing surfaces 21, 22 which abut each other, once the commutator is assembled. An opening, preferably being a recess 30, for receiving flux and/or air during the fixing of the outer layer to the inner layer is provided in at least one of the opposing surfaces 21, 22. There is also provided a DC electric motor which includes such a commutator 10.

19 Claims, 4 Drawing Sheets

U.S. PATENT DOCUMENTS

| | | | | |
|---|---|---|---|---|
| 6,657,355 | B2 * | 12/2003 | Kiyose et al. | 310/237 |
| 6,684,485 | B1 * | 2/2004 | Potocnik et al. | 29/597 |
| 6,784,589 | B1 * | 8/2004 | Sugiyama | 310/237 |
| 6,800,982 | B2 * | 10/2004 | Ebihara | 310/239 |
| 6,833,650 | B2 * | 12/2004 | Hara et al. | 310/233 |
| 7,009,323 | B1 * | 3/2006 | Simofi-Ilyes et al. | 310/235 |
| 7,043,822 | B2 * | 5/2006 | Kobayashi et al. | 29/597 |
| 7,051,422 | B2 * | 5/2006 | Sugiyama | 29/597 |
| 7,057,325 | B2 * | 6/2006 | Friebe | 310/237 |
| 7,084,547 | B2 * | 8/2006 | Moroto et al. | 310/233 |
| 7,586,230 | B2 * | 9/2009 | Hamamatsu et al. | 310/251 |
| 7,649,297 | B2 * | 1/2010 | Ishihara et al. | 310/237 |
| 7,772,739 | B2 * | 8/2010 | Nakano et al. | 310/233 |
| 2001/0013737 | A1 * | 8/2001 | Fujii et al. | 310/233 |
| 2001/0024074 | A1 * | 9/2001 | Kiyose et al. | 310/237 |
| 2001/0030485 | A1 * | 10/2001 | Kiyose et al. | 310/233 |
| 2002/0180300 | A1 * | 12/2002 | Inukai et al. | 310/233 |
| 2003/0094877 | A1 * | 5/2003 | Hara et al. | 310/233 |
| 2004/0150280 | A1 * | 8/2004 | Moroto et al. | 310/154.28 |
| 2004/0181931 | A1 * | 9/2004 | Sugiyama | 29/597 |
| 2004/0232798 | A1 * | 11/2004 | Kobayashi et al. | 310/233 |
| 2005/0046301 | A1 * | 3/2005 | Friebe | 310/237 |
| 2007/0170807 | A1 * | 7/2007 | Nakano et al. | 310/237 |
| 2008/0143211 | A1 * | 6/2008 | Hein | 310/234 |

FOREIGN PATENT DOCUMENTS

| | | | | |
|---|---|---|---|---|
| JP | 03086033 | A | * | 4/1991 |
| JP | 08308183 | A | * | 11/1996 |

* cited by examiner

COMMUTATOR

CROSS REFERENCE TO RELATED APPLICATIONS

This non-provisional patent application claims priority under 35 U.S.C. §119(a) from Patent Application No. 0800464.0 filed in United Kingdom on Jan. 11, 2008.

FIELD OF THE INVENTION

The present invention relates to a commutator for an electric machine and a method of improving a connection between a first electrically conductive inner layer of a commutator segment and a second electrically conductive outer layer fixed to an outer surface of the inner layer.

BACKGROUND OF THE INVENTION

Commutators, being rotary switches used with DC electric motors, comprise multiple electrically conductive segments arranged into a cylinder or plane and anchored into a non-conducting, typically phenolic resin, moulding compound. Each segment is physically separated and electrically isolated from those adjacent to it, so that an electrical, typically carbon, brush passing along the outer surface thereof will form a conductive path only with the segment (or segments) in contact with it at any given instant.

FIGS. 1 to 4 show one known planar commutator 1. This commutator comprises a circular phenolic electrically non-conductive base 2 having a central aperture 3 for a motor shaft, and a plurality of electrically conductive segments 4 supported by the base 2. Each segment 4 includes a copper inner layer 5 from which a tang 6 extends for connection to a winding of the rotor, and a graphite brush-contacting outer layer 7 which is fixed to the copper inner layer 5.

The inner layer 5 of the segment is formed with a number of barbs 8, in this case being three. The barbs project at a slight angle from edges of the inner layer, and locate at edges of the electrically non-conductive base 2. While this arrangement does provide a particularly secure and robust attachment, it prevents the commutator from being miniaturised due to the process of forming the radially inner barb. This poses a size limitation related to the number of segments. Omitting the inner barb leads to an unstable connection between the segment and the base which, during use in harsh vibrational environments, can result in loosening.

To attach the graphite outer layer 7 of the segment to the copper inner layer 5, soldering is typically used. However, using X-ray imaging, it has been found that excess flux and air is trapped between the two layers 5, 7 during attachment, thus resulting in a non-uniform and weaker connection.

With the copper inner layer 5 connected to the phenolic base 2 and the graphite brush-contacting outer layer 7 connected to the inner layer 5, the segments of the commutator are then formed by cutting, typically with a circular saw being drawn diagonally across the commutator. However, it has been found that the outer perimeter edge of the phenolic base 2 is often chipped by the cutting device as the cutting device is drawn out and away from the base. This results in a higher scrap rate. The chipped area weakens the commutator base, and thus cracking can more easily occur, accelerating brush wear and impacting the longevity of the motor. Also, the chipped area may prevent a mould from fully sealing around the perimeter edge, thus allowing armature overmould plastic to enter into the commutator slot, which shortens the life of the commutator.

SUMMARY OF THE INVENTION

Embodiments of the present invention seek to overcome one or more of the above-mentioned problems.

According to a first aspect of the present invention, there is provided a commutator comprising an electrically non-conductive base; and a plurality of electrically conducting segments supported by the base, each segment comprising a first electrically conductive inner layer provided on the base, and a second electrically conductive outer layer fixed to the inner layer, the inner and outer layers having opposing surfaces which abut each other, characterised in that an opening for receiving flux and/or air during the fixing of the outer layer to the inner layer is provided in at least one of the opposing surfaces.

Preferably, the said opening is a bottomed recess.

Advantageously, the opening may be provided in the opposing outer surface of the inner layer.

Optionally, the opening may be provided in the opposing inner surface of the outer layer.

Preferably, the opening is formed by pressing.

Advantageously, the commutator may further comprise an anchor which anchors the inner layer to the base. In this case, the anchor may optionally be formed from a portion of the inner layer.

Preferably, the anchor is formed from material pressed from the inner layer when forming the said opening.

Furthermore, the anchor may preferably have an inverted V-shape.

Beneficially, the anchor may be spaced from an edge of the inner layer.

Preferably, the inner layer of each segment includes a second opening in which is received a portion of the base. In this case, the second opening may preferably be an aperture which extends through the inner layer.

Preferably, the segment includes a tang formed from the inner layer.

Preferably, the inner layer is metal, the outer layer is graphite, and the base is a resin.

Advantageously, the electrically non-conductive base may preferably include a plurality of pre-formed notches for preventing or limiting chipping during segmentation.

Beneficially, the commutator may be planar. Furthermore, there may optionally be sixteen electrically conducting segments.

According to a second aspect of the present invention, there is provided a DC electric motor comprising a motor housing, stator in the housing, a rotor having a shaft rotatably mounted in the housing, a rotor core fixedly provided on the shaft and juxtaposed to the stator, a commutator in accordance with the first aspect of the invention and which is fixedly mounted on the shaft, and brush gear in electrical contact with the commutator.

According to a third aspect of the invention, there is provided a method of improving a connection between a first electrically conductive inner layer of a commutator segment and a second electrically conductive outer layer fixed together by abutting opposing surfaces, the method comprising the step of forming an opening in at least one of the opposing surfaces prior to fixing together the layers, the opening accommodating flux and/or air trapped between the inner and outer layers during fixing, so that a more uniform connection between the layers is achieved.

Preferably, the opening is a recess which is formed in the inner layer by pressing.

The method preferably further comprises a second step subsequent to the first said step of soldering the inner and outer layers together.

Advantageously, the method may optionally further comprise a third step subsequent to the first said step of forming an anchor on the inner layer, the anchor being formed from material pressed from the inner layer when forming the said opening.

Furthermore, the method may further comprise an optional fourth step subsequent to the first said step of fixing the inner layer to an electrically non-conductive base. In this case, an insert moulding process may preferably be used to connect the base and the inner layer.

Preferably, the method further comprises a fifth step during or subsequent to the fourth step of forming a plurality of notches in the said base to prevent or limit chipping during cutting. In this case, the method further comprises an optional sixth step subsequent to the fifth step of cutting the inner and outer layers to form commutator segments, the or each cut being aligned with and passing through respective notches.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
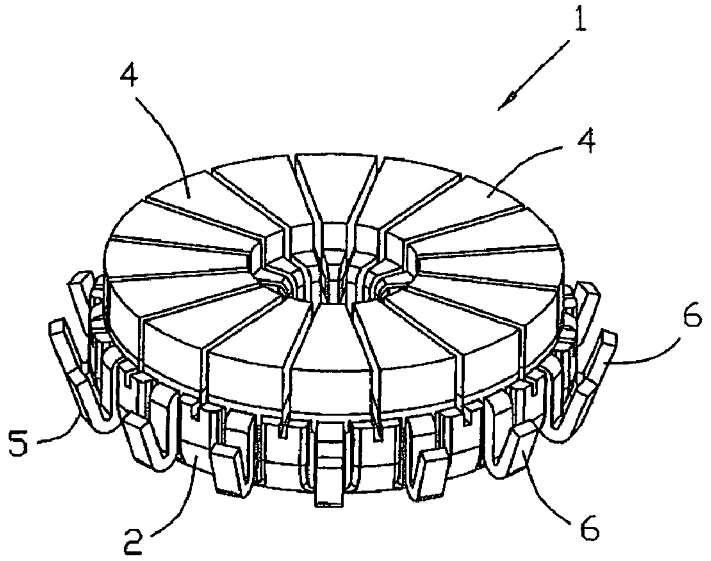
PRIOR ART FIG. 1
FIG. 1 shows a perspective view from a brush-contacting layer of a prior art segment or bar planar commutator once assembled and cut.
Figure 2:
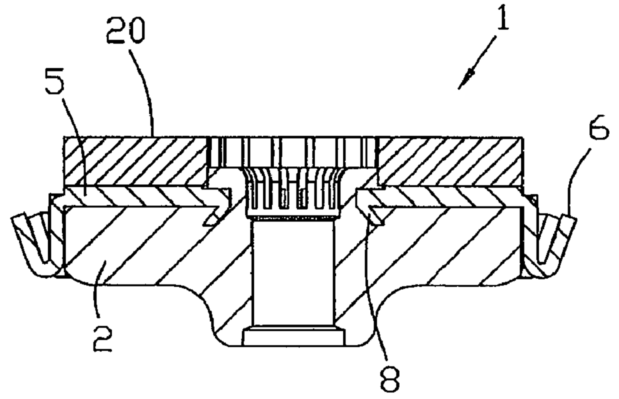
PRIOR ART FIG. 2
FIG. 2 shows a perspective view of the prior art commutator from below, the electrically non-conductive base being shown in phantom so that an electrically conductive inner layer can be seen.
Figure 3:
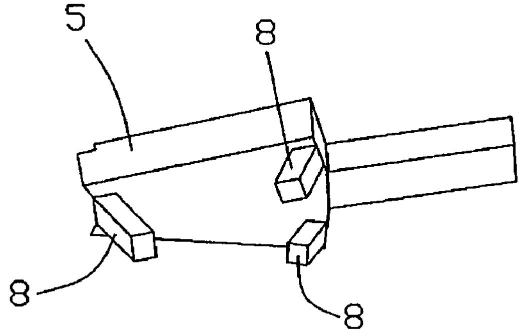
PRIOR ART FIG. 3
FIG. 3 shows a part of one of the prior art segments which forms the inner layer and to which the brush-contacting layer is fixed.
Figure 4:
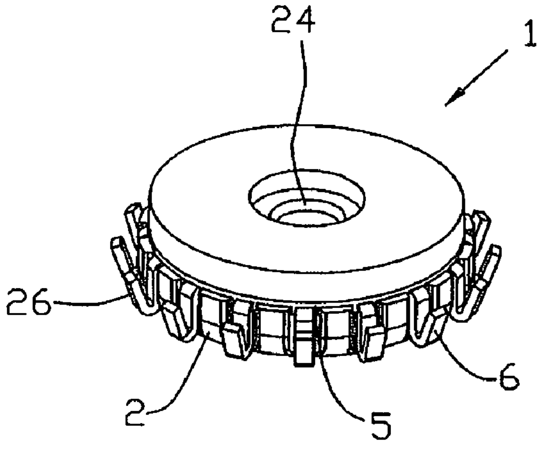
PRIOR ART FIG. 4
FIG. 4 shows an enlarged portion of the edge of the prior art commutator, prior to segmentation.

Referring firstly to FIGS. 5 to 11, there is shown a commutator 10 which comprises an electrically non-conductive disk-like base 12 having a central aperture 14 for receiving a motor shaft, and a plurality of electrically conducting segments 16 supported by the base 12. The base 12 of the commutator 10 is typically formed from phenolic moulding compound, but any suitable electrically non-conductive material can be used.

Each segment 16 comprises a first electrically conductive inner layer 18 which is attached to the base 12, and a second electrically conductive brush-contacting outer layer 20 fixed via its inner surface 21 to an opposing outer surface 22 of the inner layer 18. The inner layer 18 is preferably metal, for example copper or copper over an aluminium core. The outer layer 20 is preferably graphite. Both inner and outer layers 18, 20 also include a central aperture 24 for accommodating a motor shaft, and the inner layer 18 includes a tang 26 extending from its outer perimeter edge for connection to a motor winding.

The outer surface 22 of the inner layer 18 of each segment 16, being opposite the base-contacting surface 28, includes a recess 30. Each segment 16 includes at least one of the recesses 30 formed partway between the inner edge 32 of the inner layer 18 and the outer edge 34. The recess 30 is bottomed, and is preferably formed by pressing, as best understood from FIG. 9. Although the recess 30 is circular, any non-circular shape can also be used.

Figure 5:
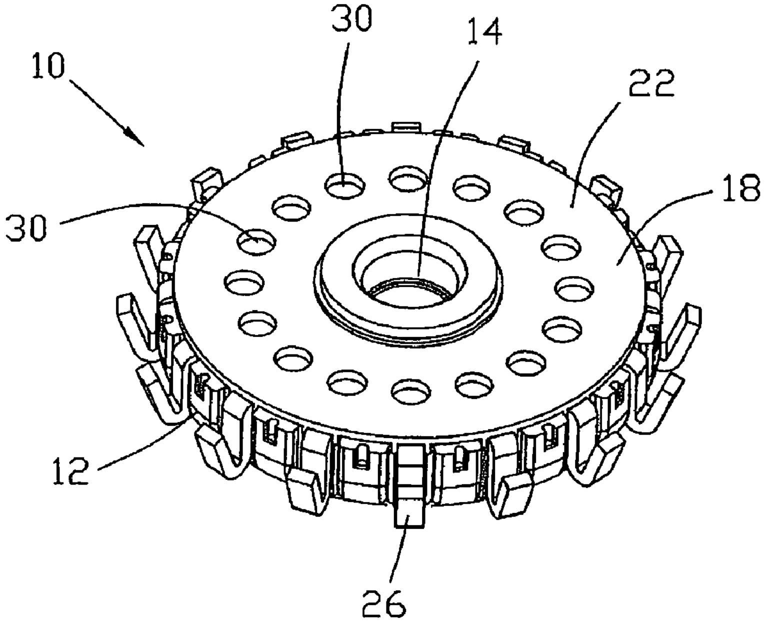
FIG. 5 shows a perspective view of one embodiment of a commutator, in accordance with the first aspect of the invention, with the outer brush-contacting layer removed for clarity and prior to segmentation.
Figure 6:
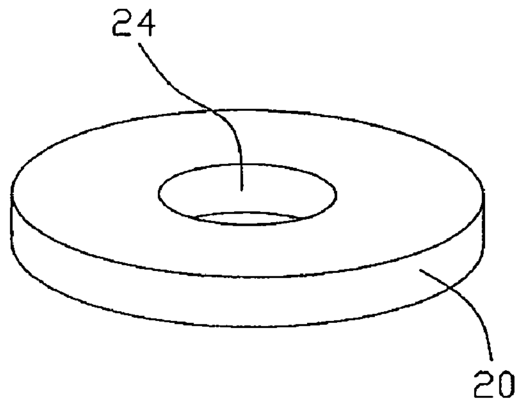
FIG. 6 shows the outer brush-contacting layer of the commutator shown in FIG. 5, prior to attachment to the electrically conductive inner layer.
Figure 7:
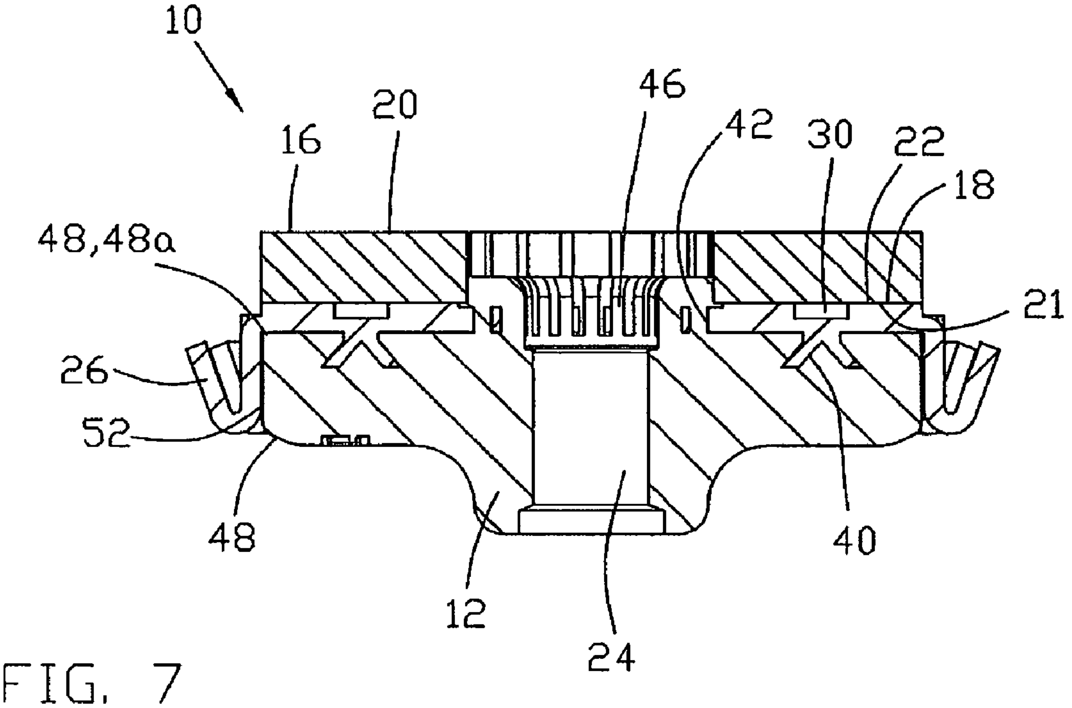
FIG. 7 is a cross-sectional view through one segment of the commutator of FIG. 5, showing the anchoring of the inner layer to the non-conductive base and the outer brush-contacting layer fixed to the inner layer.
Figure 8:
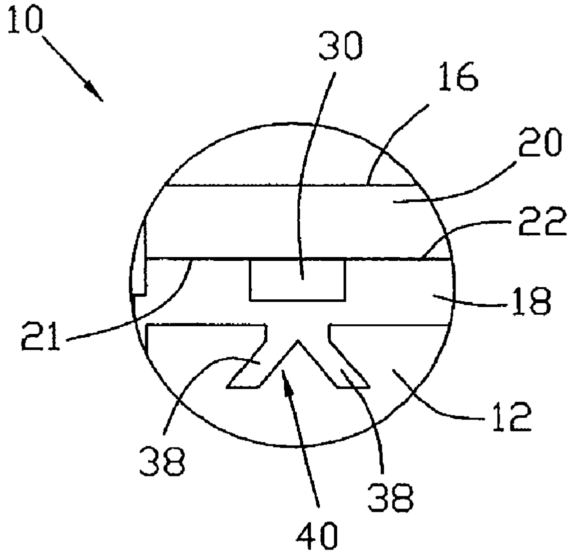
FIG. 8 is a diagrammatic cross-sectional view showing a principle of attachment of the outer brush-contacting layer to the inner layer.

FIGS. 5 to 7 show the principle behind the use of the recess 30. During assembly of the commutator 10 and prior to segmentation, the electrically conductive disk-like inner layer 18 with a plurality of recesses 30 corresponding to the number of segments 16 is attached to the base 12. The inner surface 21 of the disk-like brush-contacting outer layer 20 is then fixed to the outer surface 22 of the inner layer 18. Fixing is typically by soldering, and the recesses 30 provide a space to which excess solder flux and air trapped between the abutting surfaces can move, as diagrammatically shown in FIG. 8. It is ascertained by X-ray imaging that, by providing the recesses 30, the attachment between the inner and outer layers 18, 20 is significantly more uniform, resulting in a stronger and longer lasting connection. Once assembled, the inner and outer layers 18, 20 are segmented to form the segments 16 by a cutting device passing diametrically thereacross.

Figure 9:
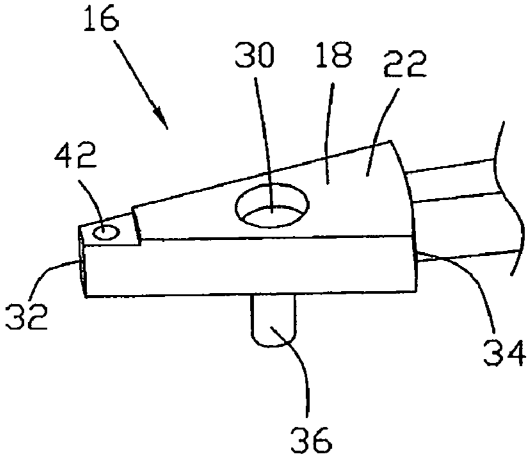
FIG. 9 is a perspective view of the inner layer of one segment of the commutator, showing the formation of a recess.
Figure 10:
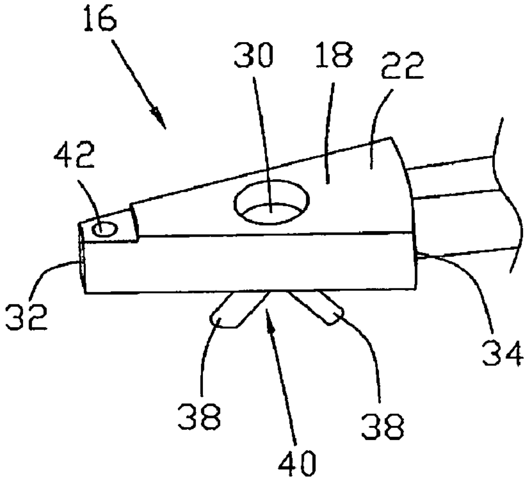
FIG. 10 is a view similar to FIG. 9 of the segment showing the formation of the anchor.

The formation of the recess 30 by pressing results in a portion 36 of the inner layer 18 projecting from the base-contacting surface 28, as shown in FIG. 9. By splitting this portion 36 into two arms 38 (see FIG. 10), thus forming an inverted V-shape, an anchor 40 is formed. The anchor 40 is spaced from the edges of the inner layer 18 of each segment 16. Preferably, the anchor 40 is substantially central of the inner layer 18, and preferably matches the position of the respective recess 30.

The inner layer 18 of each segment 16 also includes an opening 42 at or adjacent to its inner edge 32. The opening 42, in this embodiment, is a fixing aperture which extends through the thickness of the inner layer 18. However, the opening 42 could be a bottomed recess formed in the base-contacting surface 28 or a slot in the inner edge 32.

During assembly of the commutator 10, the inner layer 18 is mounted on the uncured base 12 so that the anchor 40 is embedded in the moulding compound and so that the moulding compound passes into and through the fixing aperture 42. This is best done by moulding the base 12 directly to the inner layer 18 for example by using an insert moulding technique in which the inner layer 18 is inserted into the die of a plastic moulding machine before plastics material is injected into the die to mould the base 12. Once cured, the inner layer 18 is securely and non-releasably held to the base 12 at a position partway between the inner and outer edges 46, 48 of the base 12 via the anchor 40, and also by the inner edge 32 of the inner layer 18 being encased in the base 12. This encasement forms a ring which is used to position the outer layer.

The centralised anchor 40 provides an extremely positive attachment of the inner layer 18 to the base 12, and the fixing aperture 42 and embedding of the inner edge 32 of the inner layer 18 reinforces the attachment.

Once the electrically non-conductive base 12, and electrically conductive inner and outer layers 18, 20 have been connected together as described above, the required number of segments 16 are formed by cutting diagonally there across using, for example, a circular saw or cutting disc. In this embodiment, sixteen segments are formed, and therefore eight cuts are made. However, the embodiment of the commutator described so far is applicable to any number of segments and is not limited to just sixteen.

Figure 11:
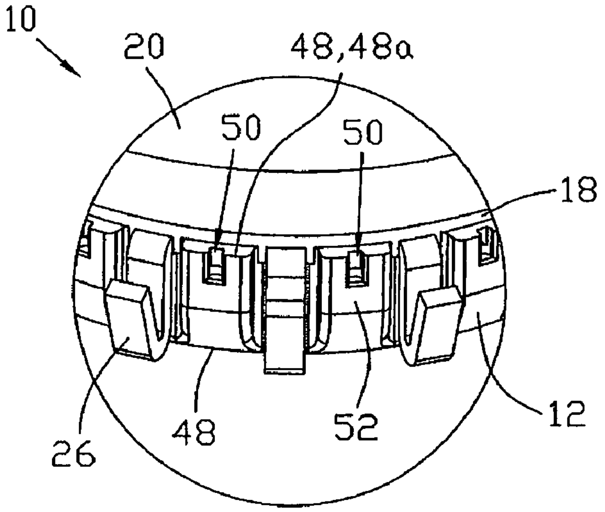
FIG. 11 is an enlarged portion of the edge of the commutator shown in FIG. 5, showing a notch in the base.

Since the moulding compound of the base 12, once cured, is relatively brittle, notches 50 are formed in the perimeter surface 52 midway between the tangs 26, during moulding and prior to cutting or segmentation. The notches 50 are best seen in FIG. 11. The notch 50 is a recess, depression, slot, channel or slit formed in the outer edge 48*a* of the base 12 nearest to the inner layer 18 of the segments 16. The cuts are aligned with the location of the notches. Consequently, as the cutting device is moved across the diameter of the inner and outer layers 18, 20 during the segmentation process, the cutting blade such as a circular saw or cutting disc, first passes through a notch before starting to cut the base and at the end of the cutting stoke, the blade passes through another notch. The notches 50 prevent or limit chipping of the base 12 by giving physical support to the area of the base being cut.

The use of the notches 50 described above is applicable to other commutators assembled in different manners, providing segmentation is formed by cutting.

The above described recess(es) in the outer layer of the inner surface is an essential feature. However, the anchor, the opening at or adjacent to the inner edge of the inner layer, and the notches are preferable features.

Although a plurality of discrete recesses are suggested, a single recess can be utilised. For example, an endless circular-shaped recess, which may be a slot or channel, could be used, which, following segmentation, provides a discrete slot or channel across each segment.

Any suitable means for connecting the inner and outer layers can be utilised, including soldering, welding and brazing. However, bonding is not precluded. In all of these cases, the recess may accept flux, but may alternatively or additionally accept air or any other material to thus provide a more uniform engagement between the two layers.

Although the use of a recess is described above, any suitable opening can be utilised. For example, the opening may be a through-hole which extends fully through the inner layer.

Although the recess or opening is described as being provided in the inner layer, the recess or opening, in addition to or as an alternative, can be provided in the opposing inner surface of the outer layer. In this case, the opposing surfaces of the inner and outer layers which abut each other may both each have an opening for receiving flux and/or air during the fixing of the outer layer to the inner layer. Alternatively, the opening may only be provided in one of the opposing layers.

The above described commutator is beneficial for use in a DC motor, and in particular 12 volt and 24 volt DC electric motors. The motor has mainly standard components, and in particular a motor housing, a stator housed in the motor housing, and a rotor having a shaft rotatably mounted in the housing, a rotor core fixedly provided on the shaft to be juxtaposed to the stator, and a commutator. Brush gear is also provided in or on the housing to be in electrical contact with the commutator.

The benefits of being able to utilise the commutator described above for a DC electric motor are that electrical resistance is lowered due to better connection between the outer and inner layers, more robust physical connection between the inner layer and the base in a smaller package, and a longer working life is achieved. A high rated 24 volt DC electric motor allows a 24 volt fuel pump and other 24 volt motor systems to be developed, thus allowing the development of the desired 24 volt electrical system for vehicles without the need for voltage changing devices. This not only reduces cost, but also saves weight and space.

Typical applications for a 24 volt DC electric motor are within any 24 volt system, such as found in trucks, tractors, and passenger vehicles.

The embodiments described above are provided by way of examples only, and various modifications will be readily apparent to the skilled person without departing form the scope of the invention as defined by the appended claims.

In the description and claims of the present application, each of the verbs “comprise”, “include”, “contain” and “have”, and variations thereof, are used in an inclusive sense, to specify the presence of the stated item but not to exclude the presence of additional items.

The invention claimed is:

1. A commutator comprising an electrically non-conductive base and a plurality of electrically conducting segments supported by the base, each segment comprising:

a first electrically conductive inner layer provided on the base, a second electrically conductive outer layer fixed to the inner layer, the inner and outer layers having opposing surfaces which abut each other, and an unfilled opening for receiving flux and/or air during the fixing of the outer layer to the inner layer provided in at least one of the opposing surfaces.

2. The commutator of claim 1, wherein the opening is a bottomed recess.

3. The commutator of claim 1, wherein the opening is provided in the opposing outer surface of the inner layer.

4. The commutator of claim 1, wherein the opening is provided in the opposing inner surface of the outer layer.

5. The commutator of claim 1, wherein the opening is a pressed recess.

6. The commutator of claim 1, further comprising an anchor which anchors the inner layer to the base.

7. The commutator of claim 6, wherein the anchor is formed from a portion of the inner layer.

8. The commutator of claim 6, wherein the anchor is formed from material pressed from the inner layer when forming the opening.

9. The commutator of claim 6, wherein the anchor has an inverted V-shape.

10. The commutator of claim 6, wherein the anchor is spaced from an edge of the inner layer.

11. The commutator of claim 1, wherein the inner layer of each segment includes a second opening in which is received a portion of the base.

12. The commutator of claim 11, wherein the second opening is an aperture which extends through the inner layer.

13. The commutator of claim 1, wherein the segment includes a tang formed from the inner layer.

14. The commutator of claim 1, wherein the inner layer is metal, the outer layer is graphite, and the base is a resin.

15. The commutator of claim 1, wherein the electrically non-conductive base includes a plurality of pre-formed notches for receiving a cutting device and preventing or limiting chipping during segmentation.

16. The commutator of claim 1, wherein the commutator is planar.

17. The commutator of claim 1, wherein there are sixteen electrically conducting segments.

18. A DC electric motor comprising: a motor housing, a stator in the housing, a rotor having a shaft rotatably mounted in the housing, a rotor core fixedly provided on the shaft and juxtaposed to the stator, a commutator as defined in claim 1 fixedly mounted on the shaft, and brush gear in electrical contact with the commutator.

19. A commutator comprising an electrically non-conductive base and a plurality of electrically conducting segments supported by the base, each segment comprising:

a first electrically conductive inner layer provided on the base, the inner layer of each segment including an aperture which extends through the inner layer in which is received a portion of the base;

a second electrically conductive outer layer fixed to the inner layer, the inner and outer layers having opposing surfaces which abut each other;

an unfilled opening for receiving flux and/or air during the fixing of the outer layer to the inner layer provided in at least one of the opposing surfaces; and an anchor formed from material pressed from the inner layer when forming the opening which anchors the inner layer to the base;

wherein the electrically non-conductive base includes a plurality of pre-formed notches for receiving a cutting device and preventing or limiting chipping during segmentation.

* * * * *